(12) United States Patent
Forsyth

(10) Patent No.: US 6,672,180 B2
(45) Date of Patent: Jan. 6, 2004

(54) MANUAL TRANSMISSION WITH UPSHIFT AND DOWNSHIFT SYNCHRONIZATION CLUTCHES

(75) Inventor: John R. Forsyth, Romeo, MI (US)

(73) Assignee: New Venture Gear, Inc., Troy, MI (US)

( * ) Notice: Subject to any disclaimer, the term of this patent is extended or adjusted under 35 U.S.C. 154(b) by 12 days.

(21) Appl. No.: 10/023,305

(22) Filed: Dec. 17, 2001

(65) Prior Publication Data

US 2002/0144562 A1 Oct. 10, 2002

Related U.S. Application Data

(60) Provisional application No. 60/281,757, filed on Apr. 5, 2001.

(51) Int. Cl.[7] ............................. F16H 3/38; F16H 3/08
(52) U.S. Cl. ........................................ 74/339; 74/329
(58) Field of Search ................. 74/339, 340, 359, 74/360, 373, 329; 192/53.32, 53.34; 477/116

(56) References Cited

U.S. PATENT DOCUMENTS

| | | | | |
|---|---|---|---|---|
| 3,941,007 A | * | 3/1976 | Webber et al. ................. | 74/340 |
| 4,271,715 A | * | 6/1981 | Arai ............................. | 74/360 |
| 4,307,624 A | * | 12/1981 | Mylenek ................... | 74/359 X |
| 4,576,264 A | * | 3/1986 | Lupo et al. ............ | 192/53.34 X |
| 5,052,238 A | * | 10/1991 | Sewell ...................... | 74/473 R |
| 5,309,789 A | * | 5/1994 | Kameda et al. ........... | 74/606 R |
| 5,367,914 A | * | 11/1994 | Ordo ........................ | 74/329 X |
| 5,890,392 A | | 4/1999 | Ludanek et al. | |
| 5,966,989 A | | 10/1999 | Reed, Jr. et al. | |
| 6,023,987 A | | 2/2000 | Forsyth | |
| 6,095,001 A | * | 8/2000 | Ruehle et al. ............ | 74/339 X |
| 6,145,398 A | | 11/2000 | Bansbach et al. | |
| 6,244,123 B1 | * | 6/2001 | Hegerath et al. ......... | 74/329 X |

* cited by examiner

*Primary Examiner*—Roger Pang
(74) *Attorney, Agent, or Firm*—Harness, Dickey & Pierce P.L.C.

(57) ABSTRACT

An automated multi-speed transmission includes an engine clutch operable to establish a releasable drive connection between the engine and an input shaft, an output shaft adapted to transfer power to the driveline, and a synchromesh geartrain having a plurality of constant-mesh gearsets that can be selectively engaged to establish a plurality of forward and reverse speed ratios. The transmission also includes power-operated dog clutches for selectively engaging the constant-mesh gearsets, and a controller for controlling coordinated actuation of the engine clutch and the power-operated dog clutches. The power-operated dog clutch associated with the low and the top gear are used during downshifts and upshifts, respectively, to actuate a clutch assembly for synchronizing the speed of the input shaft and the selected gear prior to engagement of its corresponding dog clutch.

28 Claims, 6 Drawing Sheets

MANUAL TRANSMISSION WITH UPSHIFT AND DOWNSHIFT SYNCHRONIZATION CLUTCHES

CROSS-REFERENCE TO RELATED APPLICATIONS

This application claims the benefit of U.S. Provisional Application No. 60/281,757, filed Apr. 5, 2001.

FIELD OF THE INVENTION

The present invention relates generally to multi-speed transmissions for motor vehicles and, more particularly, to an automated manual transmission and a method of controlling automated gear shifts.

BACKGROUND OF THE INVENTION

As known, automobile manufacturers are continuously striving to improve fuel efficiency. However, this effort to improve fuel efficiency, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch automated transmissions are satisfactory for their intended purpose, a need exists to develop simpler and more robust transmissions which advance the automotive transmission technology.

SUMMARY OF THE INVENTION

Accordingly, it is an object of the present invention to provide an automated transmission and a control system for permitting automatic shifting of the transmission.

This and other objects of the present invention are met by providing an automated multi-speed transmission adapted to transfer power from the engine to the driveline of a motor vehicle. The transmission includes an engine clutch operable to establish a releasable drive connection between the engine and an input shaft. The transmission also includes an output shaft adapted to transfer power to the driveline, and a synchromesh geartrain having a plurality of constant-mesh gearsets that can be selectively engaged to establish a plurality of forward and reverse speed ratio drive connections between the input shaft and the output shaft. The transmission also includes power-operated dog clutches for selectively engaging the constant-mesh gearsets, and a transmission controller for controlling coordinated actuation of the engine clutch and the power-operated dog clutches. In accordance with the invention, the power-operated dog clutch associated with the low gear is used during downshifts to controllably actuate a clutch assembly for causing speed synchronization between the input shaft and the selected gear prior to engagement of its corresponding dog clutch. Similarly, the power-operated dog clutch associated with the top gear is used during upshifts to controllably actuate a clutch assembly for causing speed matching between the input shaft and the selected gear prior to engagement of its corresponding dog clutch. The upshift and downshift synchronization clutch assemblies have sufficient capacity to permit the engine clutch to remain engaged during the speed matching phase of the gear shift so as to permit non-power interrupted ("powershift") sequential gear changes.

The downshift synchronization clutch assembly is used to increase the speed of the input shaft during downshifts while the upshift synchronization clutch assembly is used to retard the speed of the input shaft during upshifts. Therefore, selective actuation of either of these two synchronization clutch assemblies in conjunction with an appropriate control system permits upshifts and downshifts to be accomplished by slipping the appropriate clutch assembly until the input shaft speed required to engage the selected gear is reached. Once the speed is properly matched, the corresponding power-operated dog clutch is actuated to engage the selected gear.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

The present invention is directed to incorporation of an electronically-controlled speed synchronization and automated gear shift system into a constant-mesh countershaft transmission in substitution for its conventional manually-actuated dog clutch shift system. The "automated" manual transmission of the present invention incorporates a downshift synchronization clutch assembly into the low gear which can be engaged to increase the input shaft speed during downshifts. The automated manual transmission also includes an upshift synchronization clutch assembly incorporated into the high gear which can be engaged to reduce the input shaft speed during upshifts. The use of the downshift and upshift synchronization clutch assemblies permits the engine clutch to remain engaged during the speed matching phase of the automated shift process. While the automated shift system is shown in conjunction with a specific six-speed transmission arrangement, it will be understood that the particular arrangement shown is merely exemplary and is not intended to limit the wide spectrum of transmission applications to which the present invention can be utilized.

Figure 1:
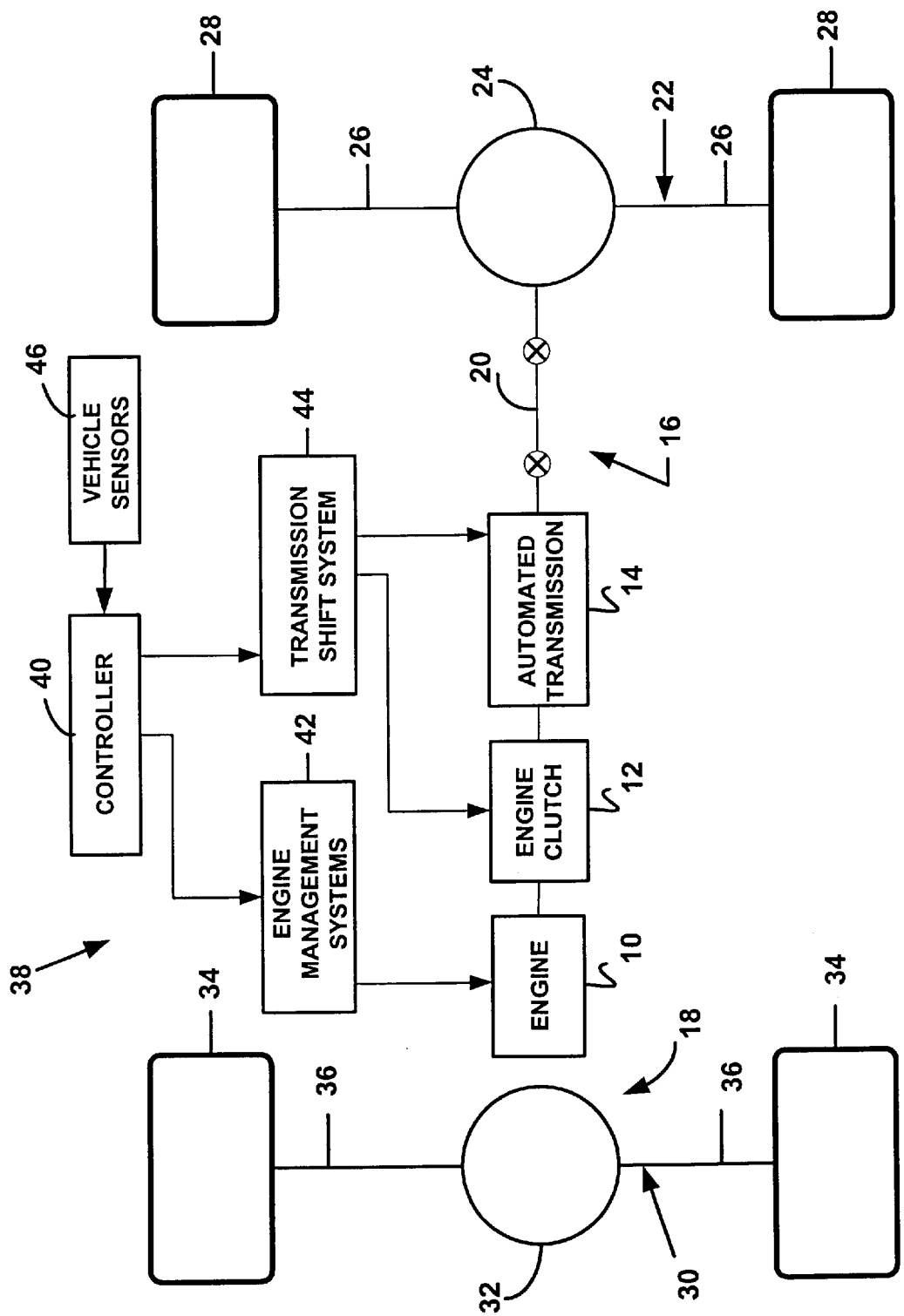
FIG. 1 is a schematic illustration of a powertrain for a motor vehicle equipped with an automated multi-speed transmission according to the present invention.
Figure 2:
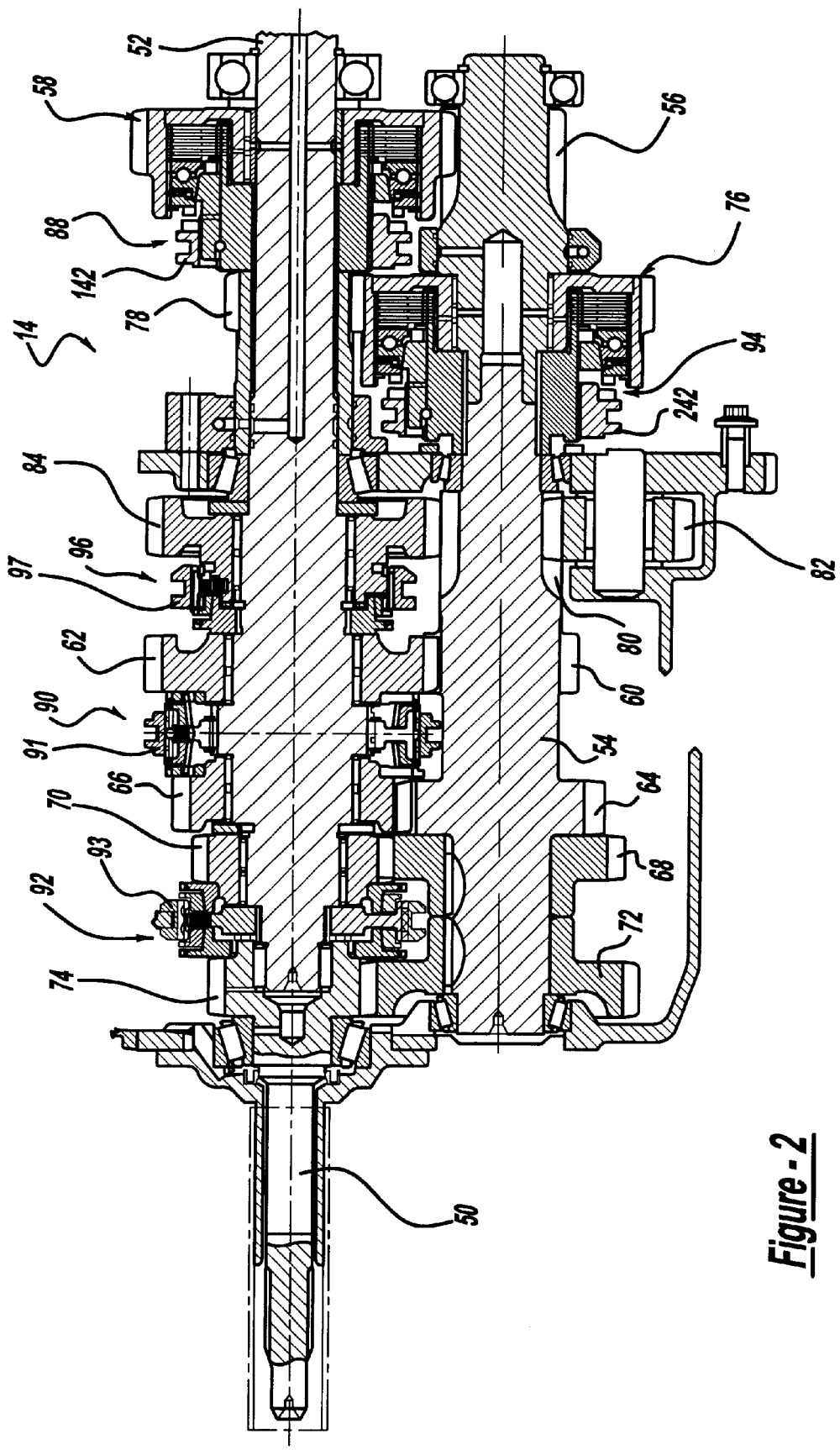
FIG. 2 is a sectional view of the automated multi-speed transmission of the present invention.

Referring to FIG. 1, a powertrain for a motor vehicle is shown to include an engine 10, releasably coupled via an engine clutch 12 to an automated transmission 14, a primary driveline 16, and a secondary driveline 18. Primary driveline 16 includes a driveshaft 20 driven by the output of transmission 14 and an axle assembly 22 having a differential unit 24 driven by driveshaft 20. A pair of axleshaft 26 interconnect a pair of wheels 28 to differential unit 24. Secondary driveline 18 includes an axle assembly 30 with a differential unit 32 interconnecting a pair of wheels 34 via axleshafts 36. A powertrain control system 38 is arranged to control operation of engine 10 and the automatic shifting of transmission 14. Control system 38 is schematically shown to include a controller 40 that is adapted to control actuation of various engine management systems 42 and a transmission shift system 44 based on operating characteristics of the motor vehicle, as detected by various vehicle sensors 46.

Referring now to FIGS. 2 through 6, the components and function of automated transmission 14 will be described in detail. In general, transmission 14 includes an input shaft 50, an output shaft 52, a countershaft 54, and a plurality of constant-mesh gearsets which can be selectively engaged to establish six forward gear ratios and one reverse gear ratio. The first gearset includes a first drive gear 56 fixed to countershaft 54 and which is meshed with a first output gear 58 rotatably supported on output shaft 52. The second gearset includes a second drive gear 60 fixed to countershaft 54 and which is meshed with a second output gear 62 rotatably supported on output shaft 52. The third gearset includes a third drive gear 64 fixed to countershaft 54 and which is meshed with a third output gear 66 rotatably supported on output shaft 52. The fourth gearset includes a fourth drive gear 68 fixed to countershaft 54 and which is meshed with a fourth output gear 70 rotatably supported on output shaft 52. The fifth gearset includes a fifth drive gear 72 fixed to countershaft 54 and which is meshed with a fifth output gear 74 fixed to input shaft 50. The sixth gearset includes a sixth drive gear 76 rotatably supported on countershaft 54 and which is meshed with a sixth output gear 78 fixed to output shaft 52. Finally, the seventh or reverse gearset includes a seventh drive gear 80 fixed to countershaft 54, and idler gear 82 meshed with seventh drive gear 80, and a seventh output gear 84 that is meshed with idler gear 82 and rotatably supported on output shaft 52.

The gearsets are selectively engaged to establish the forward and reverse gear ratio drive connections between input shaft 50 and output shaft 52 via a plurality of power-operated shift clutches. In particular, transmission shift control system 44 includes a first shift clutch 88 operable for selectively coupling first output gear 58 to output shaft 52, a second shift clutch 90 operable for selective coupling one of second output gear 62 and third output gear 66 for rotation with output shaft 52, and a third shift clutch 92 operable for selectively coupling one of fourth output gear 70 and fifth output gear 74 for rotation with output shaft 52. Transmission shift system 44 further includes a fourth shift clutch 94 for selectively coupling sixth drive gear 76 to countershaft 54 and a fifth shift clutch 96 for selectively coupling seventh output gear 84 to output shaft 52. As is seen, second shift clutch 90, third shift clutch 92 and fifth shift clutch 96 are all shown to be synchronized dog clutches of a type commonly used in manually-shifted multi-speed transmissions. In particular, each dog clutch has a clutch sleeve supported for axial sliding movement between a released position and an engaged position whereat a positive coupled engagement is established with the corresponding output gear. However, first shift clutch 88 and fourth shift clutch 94 are different in that each is a combination synchronized dog clutch and multi-plate clutch assembly that is arranged to provide a speed synchronizing function in addition to positive coupled engagement.

Figure 3:
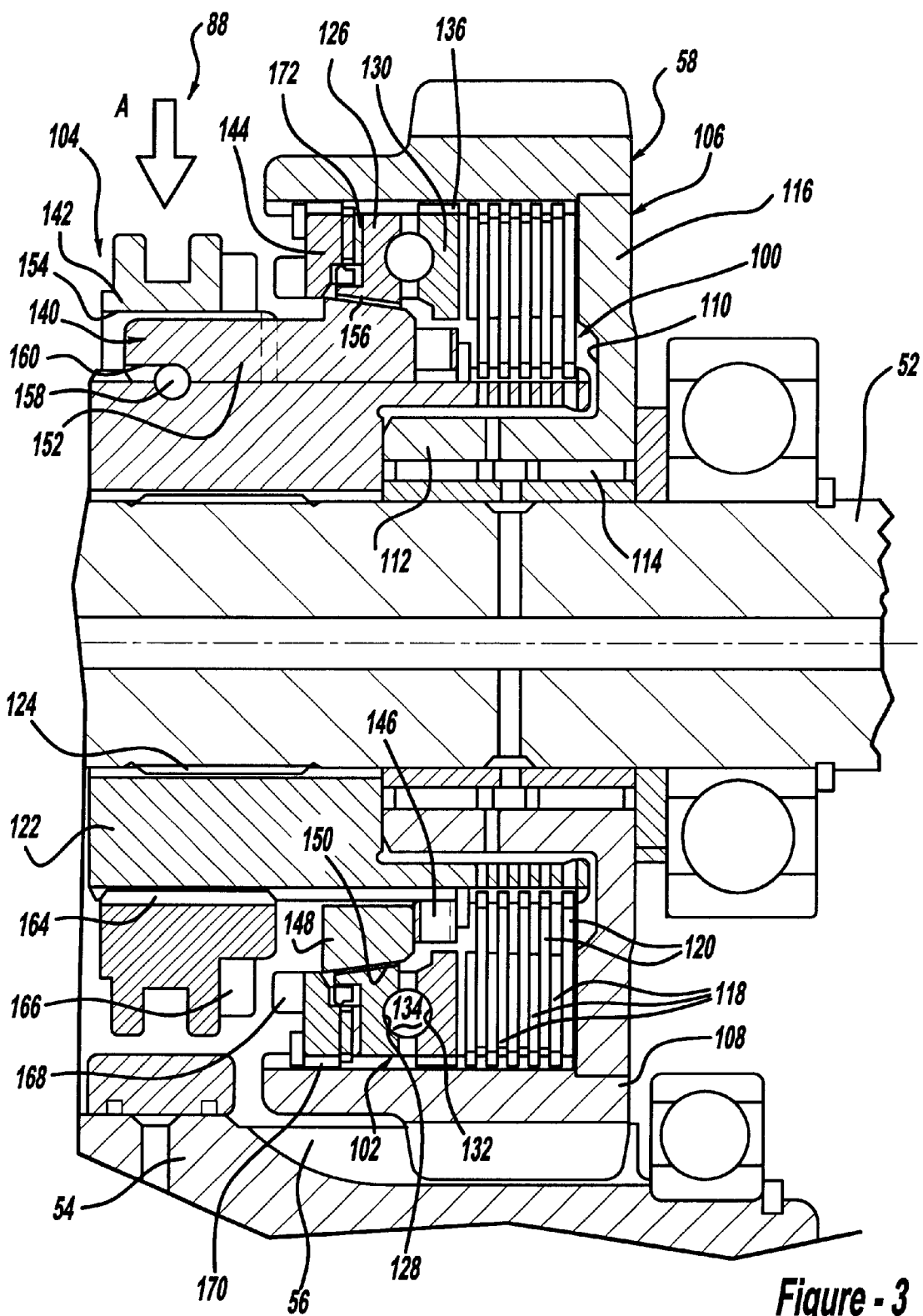
FIG. 3 is a sectional view of a downshift synchronization clutch assembly associated with the automated transmission shown in FIG. 2.
Figure 4:
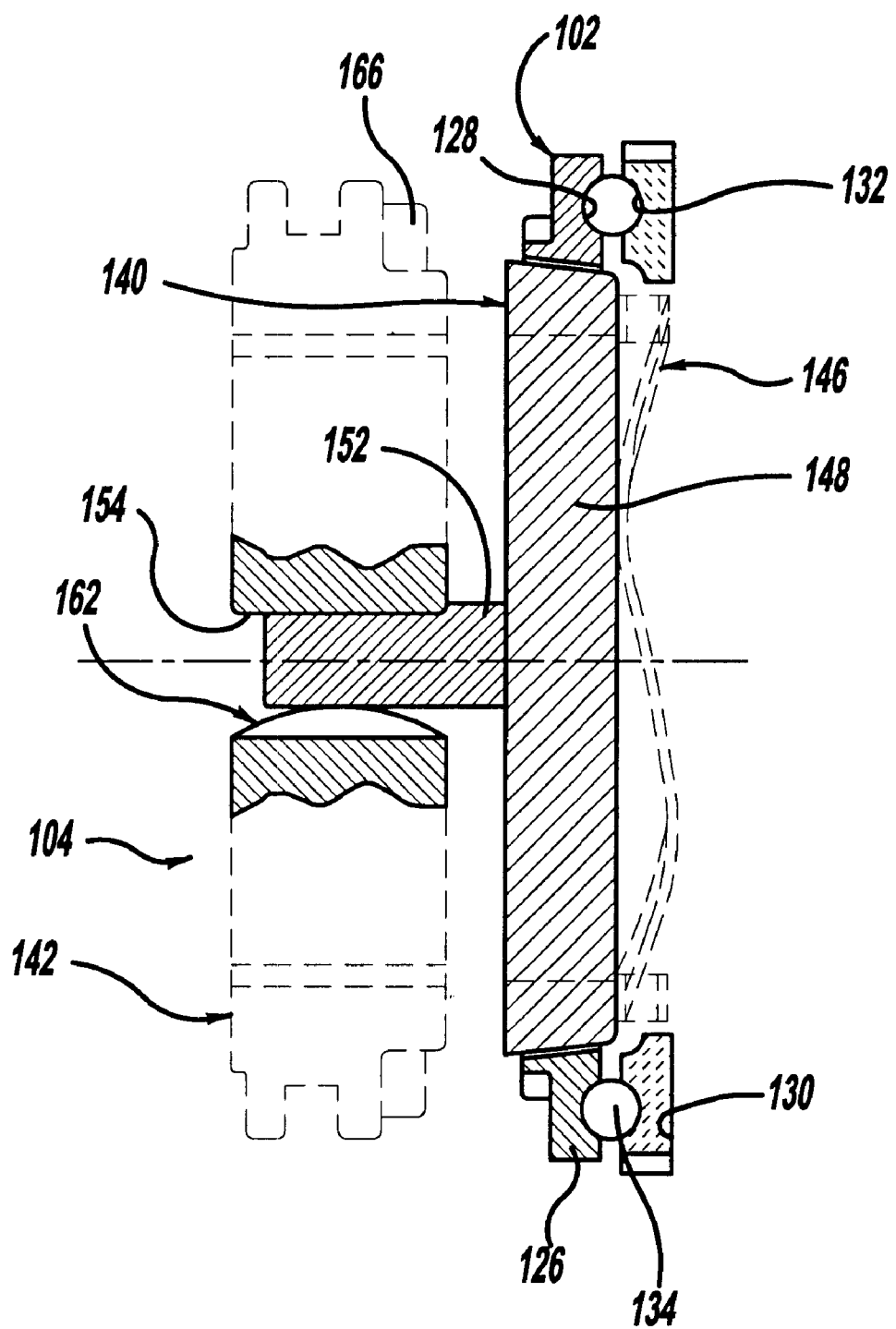
FIG. 4 is a partial sectional view of the downshift synchronization clutch assembly taken in the direction of arrow "A" shown in FIG. 3.

With particular reference to FIGS. 3 and 4, first shift clutch 88, hereinafter referred to as downshift synchronization clutch assembly, is shown to generally include a clutch pack 100, a ball-ramp clutch actuator 102, and a synchronized dog clutch 104 integrated into first output gear 58. In particular, first output gear 58 is a two-piece construction having a hub segment 106 rigidly fixed (i.e., welded) to a tubular gear segment 108 to define a clutch chamber 110. Hub segment 106 is shown to include an annular sleeve 112 that is rotatably supported on output shaft 52 by a bearing assembly 114 and a radial plate 116 formed integrally at one end of sleeve 112. Clutch pack 100 is mounted with clutch chamber 110 and includes a set of outer clutch plates 118 that are alternately interleaved with a set of inner clutch plates 120. Outer clutch plates 118 are splined to gear segment 108 of first output gear 58 while inner clutch plates 120 are splined to a drive hub 122 associated with synchronized dog clutch 104. Drive hub 122 is fixed via a splined connection 124 for rotation with output shaft 52. As such, inner clutch plates 120 rotate at the speed of output shaft 52 while outer clutch plates 118 rotate at the speed of first output gear 58, which is dictated by the rotary speed of countershaft 54 and the mesh ratio of the first gearset. Thus, first speed gear 58 and outer clutch plates 118 will always rotate slower than output shaft 52 and inner clutch plates 120 in any forward gear except the low (i.e., first) gear. as will be detailed, downshift synchronization clutch assembly 88 can be selectively actuated to provide a speed synchronizing function as a result of engagement of clutch pack 100 during a downshift from any higher gear ratio. Specifically, engagement of clutch pack 100 causes acceleration of countershaft 54 and all elements connected thereto, including input shaft 50. Accordingly, a controlled automated downshift can be accomplished by engaging and slipping clutch pack 100 until the input shaft speed required to engage the next lower gear is matched. Once the input shaft speed is properly matched to the speed of the selected output gear, its corresponding power-operated shift clutch can be engaged to establish the positive drive connection between input shaft 50 and output shaft 52.

With continued reference to FIGS. 3 and 4, an arrangement for generating and applying a clutch engagement force on clutch pack 100 will be detailed. Specifically, ball-ramp clutch actuator 102 includes an actuator ring 126 defining a set of first cam tracks 128, a reaction ring 130 defining a set of second cam tracks 132, and rollers 134 retained within the aligned sets of cam tracks 128 and 132. Cam tracks 128 and 132 are formed in the shape of an oblique section of a helical torus. Reaction ring 130 is fixed via a splined connection 136 for rotation with first output gear 58 and is supported in clutch chamber for sliding movement relative to clutch pack 100. Relative rotation between actuator ring 126 and reaction ring 130 causes rollers 134 to ride in the cam tracks which, in turn, causes a corresponding amount of axial movement of reaction ring 130. In this manner, reaction ring 130 exerts a compressive clutch engagement force on clutch pack 100. It is contemplated that tracks 128 and 132 and the load transferring ball rollers 134 can be replaced with other elements operable to cause axial displacement in response to relative rotation between two adjacent members.

Synchronized dog clutch 104 generally includes a blocker ring 140, a clutch sleeve 142, a clutch ring 144 and a return spring 146. Blocker ring 140 is supported for axial sliding movement on drive hub 122 and includes a ring segment 148 defining an outer frusto-conical friction surface 150 and a plurality of axially-extending circumferencially-spaced lugs 152 that are retained in window apertures 154 formed in clutch sleeve 142. Friction surface 150 of ring segment 148 is aligned in facing relationship with an inner frusto-conical friction surface 156 formed in actuator ring 126. Return spring 146 acts on blocker ring 140 so as to forcibly urge it in a first direction to maintain clearance between the tapered friction surfaces. Detent balls 158, seated in drive hub 122 within slots 160 formed in blocker ring lugs 152, limit movement of blocker ring 140 in the first direction so as to normally locate blocker ring 140 in a retracted position relative to actuator ring 126. FIG. 4 shows a clocking spring 162 which acts to force a chamfered edge surface of lugs 152 against a like chamfered edge surface of blocker ring aperture 154 such that blocker ring 140 moves axially with clutch sleeve 142.

Clutch sleeve 142 is secured via a splined connection 164 to drive hub 122 and is axially moveable thereon through and range of motion defined between a Released ("R") position shown and a Locked ("L") position. With clutch sleeve 142 in its R position, blocker ring 140 is located in its retracted position and clutch teeth 166 on clutch sleeve 142 are displaced from clutch teeth 168 on clutch ring 144 which, as shown, is fixed via a splined connection 170 to gear segment 108 of first output gear 58. A thrust bearing 172 is located between clutch ring 144 and actuator ring 126. With clutch sleeve 142 in its L position, clutch teeth 166 meshingly engage clutch teeth 168 such that clutch sleeve 142 positively couples first output gear 58 to drive hub 122 for rotation with output shaft 52. Moreover, movement of clutch sleeve 142 from its R position toward its L position causes corresponding axial movement of blocker ring 140 such that blocker ring friction surface 150 engages actuator ring friction surface 156. Such frictional engagement causes relative rotation between actuator ring 126 and reaction ring 130 which, as noted, causes axial movement of reaction ring 130 relative to clutch pack 100. This axial movement causes reaction ring 130 to exert a corresponding clutch engagement force on clutch pack 100 which acts to increase the rotary speed of countershaft 54 relative to output shaft 52. Thus, downshift synchronization clutch assembly 88 performs two primary functions, namely, (1) speed synchronization during downshifts, and (2) engagement of first output gear 58 to output shaft 52 for establishing the first forward gear. It should be noted that, during the speed matching operation, clutch sleeve 142 does not move completely into its L position such that clutch teeth 166 remain disengaged from clutch ring teeth 168.

Figure 5:
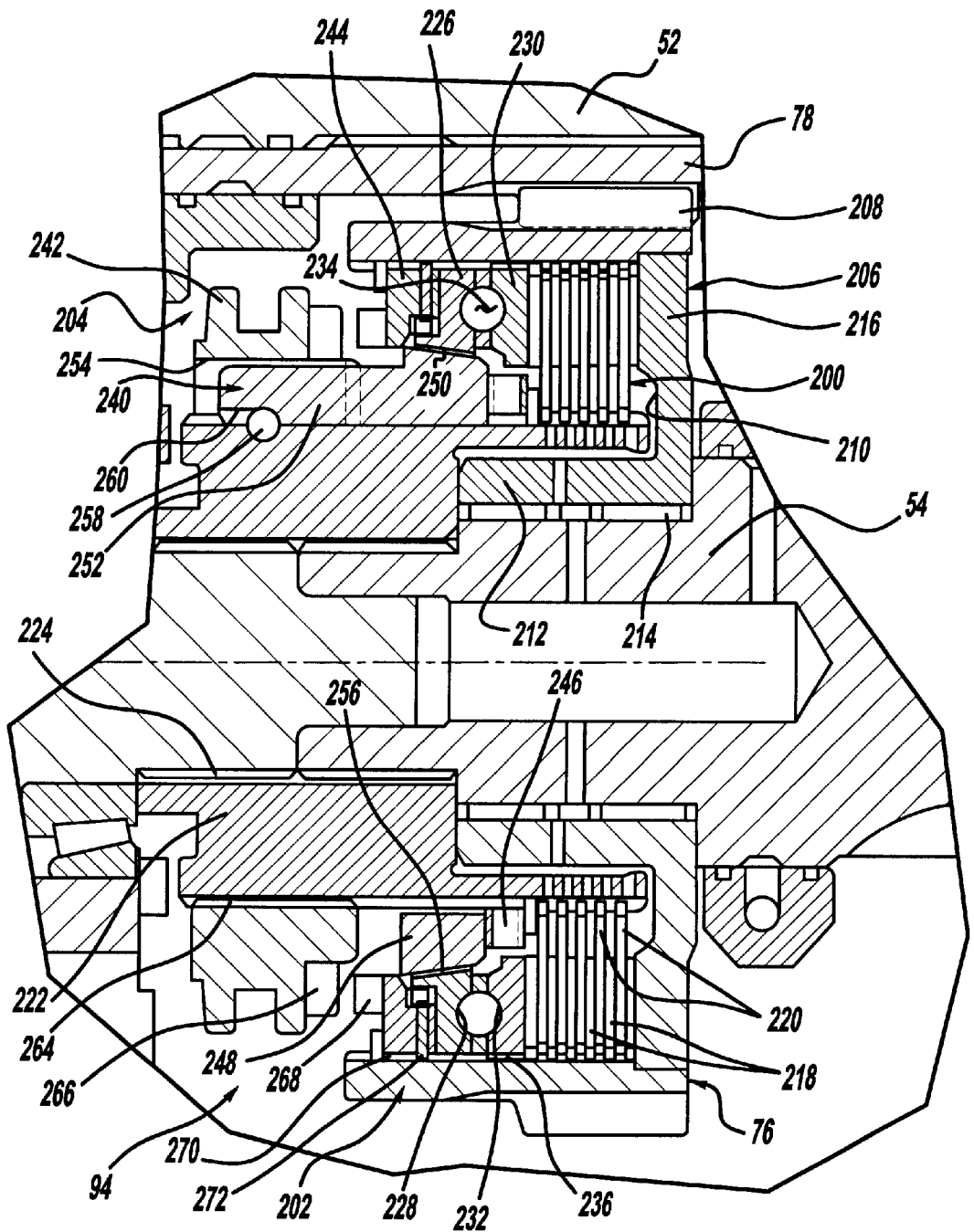
FIG. 5 is a sectional view of an upshift synchronization clutch assembly associated with the automated transmission shown in FIG. 2.

With particular reference now to FIG. 5, fourth shift clutch 94, hereinafter referred to as upshift synchronization clutch assembly, is shown to be substantially similar in structure to downshift synchronization clutch assembly 88. In particular, upshift synchronization clutch assembly 94 includes a clutch pack 200, a ball-ramp clutch actuator 202, and a synchronized dog clutch 204 integrated into sixth drive gear 76. Sixth drive gear 76 is a two-piece construction having a hub segment 206 rigidly fixed (i.e., welded) to a tubular gear segment 208 to define a clutch chamber 210. Hub segment 206 includes an annular sleeve 212 that is rotatably supported on a countershaft 54 by a bearing assembly 214 and a radial plate 216 formed at one end of sleeve 212. Clutch pack 200 is mounted in clutch chamber 210 and includes a set of outer clutch plates 218 that are splined to gear segment 208 and which are interleaved with a set of inner clutch plates 220 splined to a drive hub 222 associated with synchronized dog clutch 204. Drive hub 222 is fixed via a splined connection 224 for rotation with countershaft 54. As such, inner clutch plates 220 rotate at the speed of countershaft 54 while outer clutch plates 218 rotate at the speed of sixth drive gear 76, which is dictated by the rotary speed of output shaft 52 and the mesh ratio for the sixth gearset.

With this arrangement, sixth drive gear 76 and outer clutch plates 218 always rotate slower than countershaft 54 and inner clutch plates 220 in any forward gear except the top (i.e., sixth) gear. Thus, clutch assembly 94 can be selectively actuated to provide a speed synchronization function by engaging clutch pack 200 during an upshift from any of the lower gear ratios since engagement of clutch pack 200 acts to retard the rotary speed of countershaft 54 and all elements connected thereto. Accordingly, a controlled automated upshift can be accomplished by engaging and slipping clutch pack 200 until the input shaft speed required to engage the selected gear is matched. Once the input shaft speed is properly matched to the speed of the selected output gear, its corresponding power-operated shift clutch can be engaged to establish the positive drive connection between input shaft 50 and output shaft 52.

With continued reference to FIG. 5, an arrangement for generating and applying a clutch engagement force on clutch pack 200 is shown. Specifically, ball-ramp clutch actuator 202 includes an actuator ring 226 defining a set of first cam tracks 228, a reaction ring 230 defining a set of second cam tracks 232, and rollers 234 retained within the aligned sets of cam tracks. Reaction ring 230 is fixed via a splined connection 236 for rotation with sixth drive gear 76 and sliding axial movement relative to clutch pack 200. Relative rotation between actuator ring 226 and reaction ring 230 causes rollers 234 to ride in the aligned cam tracks which, in turn, causes a corresponding amount of axial movement of reaction ring 230 into engagement with clutch pack 200 for exerting a compressive clutch engagement force thereon.

Synchronized dog clutch 204 generally includes a blocker ring 240, a clutch sleeve 242, a clutch ring 244 and a return spring 246. Blocker ring 240 is supported for axial sliding movement on drive hub 222 and includes a ring segment 248 defining an outer frusto-conical friction surface 250 and a plurality of axially-extending lugs 252 that are retained in window apertures 254 formed in clutch sleeve 242. Friction surface 250 of ring segment 248 is aligned in facing relationship with an inner frusto-conical friction surface 256 formed in actuator ring 226. Return spring 246 acts on blocker ring 240 so as to forcibly urge it in a first direction to maintain clearance between the tapered friction surfaces. Detent balls 258 are seated in drive hub 222 within slots 260 formed in blocker ring lugs 252 to limit rearward movement of blocker ring 240 so as to normally locate blocker ring 240 in a retracted position relative to actuator ring 226. A clocking spring (not shown), similar to the one shown in FIG. 4, acts to force a chamfered edge surface of lugs 252 against a like chamfered edge surface of blocker ring aperture 254 such that blocker ring 240 moves with clutch sleeve 242.

Clutch sleeve 242 is secured via a splined connection 264 to drive hub 222 and is axially moveable thereon through and range of motion defined between a Released ("R") position shown and a Locked ("L") position. In its R position, clutch teeth 266 on clutch sleeve 242 are displaced from clutch teeth 268 on clutch ring 244 which, as shown, is fixed via a splined connection 270 to gear segment 208 of sixth drive gear 76. A thrust bearing 272 is located between clutch ring 244 and actuator ring 226. In the L position, its clutch teeth 266 meshingly engage clutch ring teeth 268 such that clutch sleeve 242 positively couples sixth drive gear 76 to drive hub 222 for rotation with countershaft 54. Moreover, axial movement of clutch sleeve 242 from its R position toward its L position causes corresponding axial movement of blocker ring 240 for causing blocker ring friction surface 250 to engage actuator ring friction surface 256. Such frictional engagement causes relative rotation between actuator ring 226 and reaction ring 230 which, as noted, causes axial movement of reaction ring 230 relative to clutch pack 200. Reaction ring 230 applies a compressive clutch engagement force on clutch pack 200 while acts to reduce the rotary speed of countershaft 54 relative to output shaft 52. Thus, upshift synchronization clutch assembly 94 also performs two primary functions, namely, (1) speed synchronization during upshifts, and (2) clutch engagement of sixth drive gear 76 to countershaft 54 for establishing the sixth forward gear.

Figure 6:
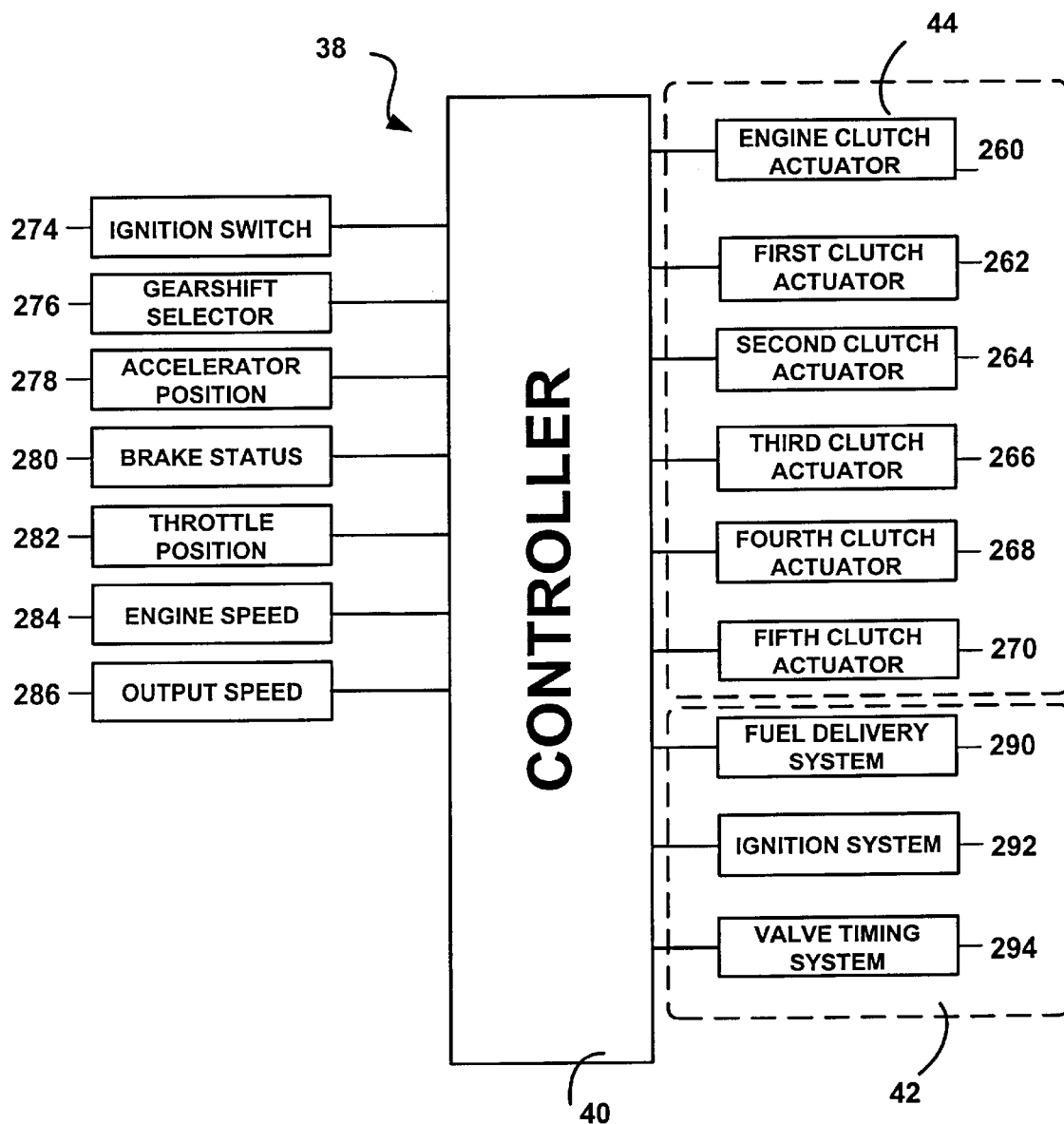
FIG. 6 is a diagram of a powretrain control system used to control automatic shifting of the automated transmission.

FIG. 6 schematically illustrates the components contemplated for use with powertrain control system 38. In particular, transmission shift system 44 is shown to include a plurality of power-operated clutch actuators operable to control actuation of the corresponding engine and shift clutches. These include an engine clutch actuator 260 operable for controlling engagement of engine clutch 12, a first clutch actuator 262 operable for controlling axial movement of clutch sleeve 142 associated with downshift synchronization clutch assembly 88, a second clutch actuator 264 operable for controlling axial movement of a clutch sleeve 91 associated with second shift clutch 90, and a third clutch actuator 266 operable for controlling axial movement of a clutch sleeve 93 associated with third shift clutch 92. Additionally, a fourth clutch actuator 268 is operable for controlling axial movement of clutch sleeve 242 associated with upshift synchronization clutch assembly 94, and a fifth clutch actuator 270 is operable for controlling axial movement of a clutch sleeve 97 associated with fifth shift clutch 96. Each power-operated clutch actuator is an electrically-activated device adapted to receive an electric control signal from controller 40.

As noted, controller 40 receives input signals from various sensors, cumulatively identified in FIG. 1 as vehicle sensors 46. Controller 40 is principally comprised of a microcomputer having a central processing unit (CPU), random-access memory (RAM), read-only memory (ROM), and an input-output actuator interface. Controller 40 performs data processing operations to execute various control routines according to control programs and/or maps stored in the ROM. Controller 40 receives data from an ignition switch 274, a gearshift lever switch 276, an accelerator position sensor 278, a brake status switch 280, and a throttle position sensor 282. In addition, other inputs include an engine speed sensor 284 and an output shaft speed sensor 286. Ignition switch 274 is closed when the vehicle key is turned on. Corresponding switches in gearshift selector switch 276 are closed when the gearshift mechanism is located in its PARK, NEUTRAL, REVERSE and DRIVE positions. Accelerator position sensor 278 senses the depression angle of an accelerator pedal. Brake status switch 280 is turned on when the brake pedal is depressed. Throttle position sensor 282 senses the degree of opening of the engine throttle valve. Engine speed sensor 284 senses a parameter indicative of the rotary speed of the drive shaft of engine 10. Finally, shaft speed sensor 286 senses the rotary speed of output shaft 52 or propshaft 20 and can further be used as an indication of vehicle speed.

Based on the operating information inputted to controller 40, a mode of operation of the powertrain is selected and controller 40 sends electric control signals to various power-operated control devices. Specifically, controller 40 monitors and continuously controls shifting of transmission 14 and various engine management systems for controlling the speed and torque generated by engine 10. These engine management control systems 42 include a fuel delivery system 290, an ignition system 292, and a valve timing system 294.

When it is desired to supply motive power from engine 10 to primary driveline 16, the gearshift lever is moved from PARK to DRIVE and engine clutch 12 is engaged via actuation of engine clutch actuator 260 for delivering drive torque to input shaft 50, and first clutch actuator 262 is activated to move clutch sleeve 142 to its Locked position, thereby establishing the first forward gear drive connection with output shaft 52. When the operating conditions of the vehicle indicate a need to automatically shift into second gear, clutch sleeve 142 is moved to its Released position for uncoupling first output gear 58 from output shaft 52. Controller 40 then activates fourth clutch actuator 268 to cause clutch sleeve 242 to move from its Released position toward its Locked position. Such axial movement of clutch sleeve 242 causes corresponding axial movement of blocker ring 240, in opposition to return spring 246, which cause blocker ring friction surface 250 to engage friction surface 256 on actuator ring 226. As noted, such frictional engagement results in relative rotation between actuator ring 226 and reaction ring 230, thereby causing reaction ring 230 to move axially and exert a clutch engagement force on clutch pack 200. With engine clutch 12 still engaged, slipping of clutch pack 200 causes the rotary speed of countershaft 54 to decrease relative to output shaft 52. Once controller 40 determines that the rotary speed of second output gear 62 is synchronized with the rotary speed of output shaft 52, second clutch actuator 264 is activated to move clutch sleeve 91 from its central released position to an engaged position. With clutch sleeve 91 in its engaged position, second output gear 62 is releasably coupled to output shaft 52, thereby establishing the second gear drive connection. Thereafter, fourth clutch actuator 268 is signaled to return clutch sleeve 242 to its Released position so as to release clutch pack 200. Preferably, engine management systems 42 are controlled in conjunction with transmission shift system 44 to reduce engine torque during the speed-matching phase of the upshift gear shift operation.

Thereafter, when the operating conditions of the vehicle indicate a need to automatically shift into third gear, second clutch actuator 264 is actuated to cause clutch sleeve 91 to move from its engaged position with second output gear 62 to its central released position, thereby uncoupling second output gear from output shaft. Controller then activates fourth clutch actuator 268 to again cause clutch pack 200 to retard the rotary speed of countershaft 54 relative to output shaft 52. Once the rotary speed of third output gear 66 is matched with that of output shaft 52, second clutch actuator 264 is activated to move clutch sleeve 91 from its released position to a second engaged position. With clutch sleeve 91 in its second engaged position, third output gear 66 is releasably coupled to output shaft 52 and the third gear drive connection is established. This process of releasing the engaged clutch sleeve, engaging clutch pack 200 for speed synchronization, and subsequently engaging the next sequential output gear is repeated for upshifts into each of the fourth, fifth and sixth forward gears. However, clutch sleeve 242 is actually moved to its Locked position when the sixth gear is established to positively couple sixth drive gear 76 to countershaft 54. In sixth gear, with clutch sleeve 242 coupled to clutch ring 244, blocker ring 240 can be held in place or, alternatively, can retract to release clutch pack 200. Reverse gear is established when the gearshift mechanisms is moved to its REVERSE position and fifth clutch actuator 270 is activated to move clutch sleeve 97 into engagement with seventh output gear 84.

In a similar manner to that described for sequential upshifts, the automated shift process for sequential downshifts includes releasing the engaged gear, activating first clutch actuator 262 to move clutch sleeve 142 from its Released position toward its Locked position to cause engagement of clutch pack 100, and engaging the next lower output gear once speed synchronization is complete. As noted, engagement of clutch pack 100 during upshifts is used to increase the rotary speed of countershaft 54 relative to output shaft 52. Engine management systems 42 are again controlled during such upshifts to increase the input shaft speed to assist in smooth speed matching. Again, this shift process is conducted with engine clutch 12 maintained in its engaged condition for providing automated powershifts.

While transmission 14 is shown to include synchronized dog clutches for engaging the second through sixth output gears and the reverse output gear, it is contemplated that non-synchronized dog clutches, or equivalent devices, can be used since the speed matching process can be accurately controlled to eliminate the need for pre-engagement synchronization. The present invention provides an arrangement for incorporating an automated shift system into an otherwise conventional synchromesh multi-speed manual transmission which will permit smooth sequential shifting. Thus, the comfort and convenience of an automatic transmission is realized with the fuel economy advantages typically limited to manual transmissions.

A preferred embodiment of the invention has been disclosed to provide those skilled in the art an understanding of the best mode currently contemplated for the operation and construction of the automated transmission. The invention being thus described, it will be obvious that various modifications can be made without departing from the true spirit and scope of the invention, and all such modifications as would be considered by those skilled in the art are intended to be included within the scope of the following claims.

What is claimed is:

1. A transmission for transferring drive power from an engine to a driveline, comprising:

a first shaft adapted to be driven by the engine;

a second shaft adapted to drive the driveline;

a first constant-mesh gearset having a first drive gear fixed to said first shaft and which is meshed with a first driven gear rotatably supported on said second shaft;

a second constant-mesh gearset having a second drive gear fixed to said first shaft and which is meshed with a second driven gear rotatably supported on said second shaft;

a third constant-mesh gearset having a third drive gear fixed to said first shaft and which is meshed with a third driven gear rotatably supported on said second shaft;

a fourth constant-mesh gearset having a fourth drive gear fixed to said second shaft and which is meshed with a fourth driven gear rotatably supported on said first shaft;

a first clutch having a first sleeve moveable between a released position and a locked position for releaseably coupling said first driven gear to said second shaft, a first clutch pack operably disposed between said first driven gear and second shaft, a first thrust mechanism for exerting a clutch engagement force on said first clutch pack in response to movement of said first sleeve from its released position toward its locked position, and a first power-operated actuator for moving said first sleeve between its released and locked positions;

a first clutch ring fixed for rotation with said first driven gear and having clutch teeth engageable with clutch teeth on said first sleeve when said first sleeve is in its locked position;

a blocker ring supported for sliding movement in response to movement of said first sleeve, said blocker ring adapted to engage said thrust mechanism for causing movement thereof relative to said first clutch pack;

a second clutch having a second sleeve that is moveable from a released position to a first locked position for releaseably coupling said second driven gear to said second shaft, said second sleeve is further moveable from its released position to a second locked position for releaseably coupling said third driven gear to said second shaft, and a second power-operated actuator for moving said second sleeve;

a third clutch having a third sleeve moveable between a released position and a locked position for releaseably coupling said fourth driven gear to said first shaft, a second clutch pack operably disposed between said fourth driven gear and said first shaft, a second thrust mechanism for exerting a clutch engagement force on said second clutch pack in response to movement of said fourth sleeve from its released position toward its locked position, and a third power-operated actuator for moving said third sleeve; and a transmission controller for controlling actuation of said first, second and third power-operated actuators.

2. The transmission of claim 1 wherein said first clutch includes a set of first clutch plates splined to said first driven gear which are interleaved with a set of second clutch plates splined to a hub fixed for rotation with said second shaft, said first sleeve splined to said hub for movement therein between its released and locked positions, and wherein movement of said first sleeve toward its locked position generates said clutch engagement force for frictionally clamping said first and second clutch plates to provide a speed synchronizing function between said first and second shafts.

3. The transmission of claim 1 wherein said thrust mechanism is a ball-ramp unit having an actuator ring in contact with said blocker ring, a reaction ring fixed to said first driven gear and adapted to engage said first clutch pack, and rollers retained in aligned cam tracks formed in said actuator ring and said reaction ring, whereby axial movement of said blocker ring caused by movement of said first sleeve toward its locked position causes relative rotation between said actuator ring and said reaction ring such that said rollers move said reaction ring into engagement with said first clutch pack.

4. The transmission of claim 1 wherein said second clutch pack includes a set of first clutch plates splined to said fourth driven gear which are interleaved with a set of second clutch plates splined to a hub fixed for rotation with said first shaft, said third sleeve splined to said hub for movement therein between its released and locked position, and wherein movement of said third sleeve toward its locked position causes said third sleeve to contact said second thrust mechanism and generate said clutch engagement force for frictionally clamping said first and second clutch plates to provide a speed synchronizing function between said first and second shafts.

5. A transmission for transferring drive power from an engine to a driveline, comprising:

a first shaft adapted to be driven by the engine;

a second shaft adapted to drive the driveline;

a first constant-mesh gearset having a first drive gear fixed to said first shaft and which is meshed with a first driven gear rotatably supported on said second shaft;

a second constant-mesh gearset having a second drive gear fixed to said first shaft and which is meshed with a second driven gear rotatably supported on said second shaft;

a third constant-mesh gearset having a third drive gear fixed to said first shaft and which is meshed with a third driven gear rotatably supported on said second shaft;

a fourth constant-mesh gearset having a fourth drive gear fixed to said second shaft and which is meshed with a fourth driven gear rotatably supported on said first shaft;

a first clutch having a first sleeve moveable between a released position and a locked position for releaseably coupling said first driven gear to said second shaft, a first clutch pack operably disposed between said first driven gear and second shaft, a first thrust mechanism for exerting a clutch engagement force on said first clutch pack in response to movement of said first sleeve from its released position toward its locked position, and a first power-operated actuator for moving said first sleeve between its released and locked positions;

a second clutch having a second sleeve that is moveable from a released position to a first locked position for releaseably coupling said second driven gear to said second shaft, said second sleeve is further moveable from its released position to a second locked position for releaseably coupling said third driven gear to said second shaft, and a second power-operated actuator for moving said second sleeve;

a third clutch having a third sleeve moveable between a released position and a locked position for releaseably coupling said fourth driven gear to said first shaft, a second clutch pack operably disposed between said fourth driven gear and said first shaft, a second thrust mechanism for exerting a clutch engagement force on said second clutch pack in response to movement of said fourth sleeve from its released position toward its locked position, and a third power-operated actuator for moving said third sleeve; and a transmission controller receiving signals from speed sensors capable of detecting the rotary speed of said first and second shafts and controlling seguential upshifts from a first speed ratio through a fourth speed ratio by controlling actuation of said first, second and third power-operated actuators, wherein said first speed ratio drive connection is established between said first and second shafts when said first sleeve is located in its locked position and said second and third sleeves are located in their released positions, a second speed ratio drive connection is established between said first and second shafts when said second sleeve is located in its first locked position and said first and third sleeves are located in their released positions, a third speed ratio drive connection is established between said first and second shafts when said second sleeve located in its second locked position and said first and third sleeves are located in their released positions, and said fourth speed ratio drive connection is established between said first and second shafts when said third sleeve is in its locked position and said first and second sleeves are in their released positions.

6. The transmission of claim 5 wherein an upshift from said first speed ratio to said second speed ratio results in said first sleeve being moved from its locked position to its released position, said third sleeve being moved from its released position toward its locked position for engaging said second clutch pack and synchronizing the speed of said second shaft to that of said second driven gear, said second sleeve then being moved to its first locked position to positively couple said second driven gear to said second shaft, and said third sleeve then being returned to its released position.

7. The transmission of claim 6 wherein a downshift from said second speed ratio to said first speed ratio is established by moving said second sleeve from its first locked position to its released position, moving said first sleeve from its released position toward its locked position to engage said first clutch pack and synchronize the rotary speed of said first driven gear to that of said second shaft, and then continuing movement of said first sleeve into its locked position for coupling said first driven gear to said second shaft.

8. The transmission of claim 6 wherein an upshift from said second speed ratio to said third speed ratio results in said second sleeve being moved from its first locked position to its released position, said third sleeve being moved from its released position toward its locked position for engaging said second clutch pack and synchronizing the rotary speed of said second shaft to that of said third driven gear, said second sleeve then being moved to its second locked position to positively couple said third driven gear to said second shaft, and said third sleeve then being returned to its released position.

9. The transmission of claim 8 wherein a downshift from said third speed ratio to said second speed ratio is established by moving said second sleeve from its second locked position to its released position, moving said first sleeve from its released position toward its locked position for engaging said first clutch pack and synchronizing the rotary speed of said second driven gear to that of said second shaft, moving said second sleeve from its released position to its first locked position, and returning said first sleeve to its released position.

10. The transmission of claim 8 wherein an upshift from said third speed ratio to said fourth speed ratio is established by moving said second sleeve from its second locked position to its released position, moving said third sleeve from its released position towards its locked position for engaging said second clutch pack and synchronizing the rotary speed of said fourth driven gear to that of said first shaft, and then continuing movement of said third sleeve to its locked position for coupling said fourth driven gear to said first shaft.

11. The transmission of claim 10 wherein a downshift from said fourth speed ratio to said third speed ratio is established by moving said third sleeve from its locked position to its released position, moving said first sleeve from its released position toward its locked position for engaging said first clutch pack and synchronizing the rotary speed of said third driven gear to that of said second shaft, moving said second sleeve from its released position to its second engaged position to directly couple said third driven gear to said second shaft, and then returning said first sleeve to its released position.

12. A transmission for transferring drive power from an engine to a driveline, comprising:
  a first shaft adapted to be driven by the engine;
  a second shaft adapted to drive the driveline;
  a first constant-mesh gearset having a first drive gear fixed to said first shaft and which is meshed with a first driven gear rotatably supported on said second shaft;
  a second constant-mesh gearset having a second drive gear fixed to said first shaft and which is meshed with a second driven gear rotatably supported on said second shaft;
  a third constant-mesh gearset having a third drive gear fixed to said first shaft and which is meshed with a third driven gear rotatably supported on said second shaft;
  a fourth constant-mesh gearset having a fourth drive gear fixed to said second shaft and which is meshed with a fourth driven gear rotatably supported on said first shaft;
  a first clutch having a first sleeve moveable between a released position and a locked position for releaseably coupling said first driven gear to said second shaft, a first clutch pack operably disposed between said first driven gear and second shaft, a first thrust mechanism for exerting a clutch engagement force on said first clutch pack in response to movement of said first sleeve from its released position toward its locked position, and a first power-operated actuator for moving said first sleeve between its released and locked positions;
  a second clutch having a second sleeve that is moveable from a released position to a first locked position for releaseably coupling said second driven gear to said second shaft, said second sleeve is further moveable from its released position to a second locked position for releaseably coupling said third driven gear to said second shaft, and a second power-operated actuator for moving said second sleeve;
  a third clutch having a third sleeve moveable between a released position and a locked position for releaseably coupling said fourth driven gear to said first shaft, a second clutch pack operably disposed between said fourth driven gear and said first shaft, a second thrust mechanism for exerting a clutch engagement force on said second clutch pack in response to movement of said fourth sleeve from its released position toward its locked position, and a third power-operated actuator for moving said third sleeve;
  a transmission controller for controlling actuation of said first, second and third power-operated actuators;
  a third shaft driven by the engine;
  a fifth constant-mesh gearset having a fifth drive gear fixed to said third shaft which is meshed with a fifth driven gear fixed to said first shaft; and
  a fourth clutch having a fourth sleeve moveable from a released position to a locked position for releaseably coupling said fifth drive gear to said second shaft, and a fourth power-operated actuator for moving said fourth sleeve under the control of said controller.

13. The transmission of claim 12 further comprising a sixth constant-mesh gearset having a sixth drive gear fixed to said first shaft and which is meshed with a sixth driven gear rotatably supported on said second shaft, and wherein said fourth sleeve is moveable from its released position to a second locked position to couple said sixth driven gear to said second shaft.

14. An automated shift multi-speed transmission driven by an engine for transferring rotary power to a driveline, comprising:
  an input shaft driven by the engine;
  a countershaft driven by said input shaft;
  an output shaft driving the driveline;
  first, second, third, fourth, and fifth gearsets driven by said countershaft;
  a sixth gearset driven by said output shaft;
  a first clutch having a first sleeve moveable between a released position and a locked position for coupling said first gearset to said output shaft, and a first friction clutch disposed between said first gearset and said output shaft and which is actuated in response to movement of said first sleeve from its released position toward its locked position;
  a second clutch having a second sleeve moveable between a released position, a first locked position for releaseably coupling said second gearset to said output shaft, and a second locked position for releaseably coupling said third gearset to said output shaft;
  a third clutch having a third sleeve moveable between a released position, a first locked position whereat said fourth gearset is releaseably coupled to said output shaft, and a second locked position whereat said fifth gearset is releaseably coupled to said output shaft;
  a fourth clutch having a fourth sleeve moveable between a released position and a locked position for releaseably coupling said sixth gearset to said countershaft, and a second friction clutch disposed between said sixth gearset and said countershaft and which is actuated in response to movement of said fourth sleeve from its released position toward its locked mode;
  a first actuator for controlling movement of said first sleeve;
  a second actuator for controlling movement of said second sleeve;
  a third actuator for controlling movement of said third sleeve;
  a fourth actuator for controlling movement of said fourth sleeve;
  speed sensors for detecting the rotary speed of said input shaft and said output shaft; and
  a controller receiving speed signals from said speed sensors and generating control signals for selectively actuating said first, second, third, and fourth actuators to establish six distinct gear ratio drive connections between said input shaft and said output shaft.

15. The automated shift multi-speed transmission of claim 14 wherein said first gearset includes a first drive gear fixed for rotation with said countershaft and which is meshed with a first driven gear rotatably supported on said output shaft, and wherein said first friction clutch includes a clutch pack of alternately interleaved clutch plates connected between said first driven gear and output shaft, and wherein said clutch pack is disengaged when said first sleeve is located in its released position and is progressively engaged by a thrust mechanism in response to movement of said first sleeve toward its locked position for providing a speed synchronization function between said countershaft and said output shaft.

16. The automated shift multi-speed transmission of claim 15 wherein said first sleeve is coupled to a clutch ring fixed to said first driven gear when said first sleeve is in its locked position, and wherein said first clutch further includes a synchronizer that is moveable with said first sleeve into and out of engagement with said thrust mechanism.

17. The automated shift multi-speed transmission of claim 16 wherein said thrust mechanism is a ball-ramp unit having an input member actuated by said synchronizer and output member adapted to apply a compressive clutch engagement force on said clutch pack.

18. The automated shift multi-speed transmission of claim 14 wherein a first gear ratio is established when said first sleeve is located in its locked position and said second, third and fourth sleeves are located in their respective released positions, a second gear ratio is established when said second sleeve is located in its first locked positions and said first, third and fourth sleeves are located in their respective released positions, a third gear ratio is established when said second sleeve is located in its second locked position and said first, third and fourth sleeves are located in their respective released positions, a fourth gear ratio is established when said third sleeve is located in its first locked position and said first, second and fourth sleeves are located in their respective released positions, a fifth gear ratio is established when said third sleeve is located in its second locked position and said first, second and fourth sleeves are located in their respective released positions, and a sixth gear ratio is established when said fourth sleeve is located in its locked position and said first, second and third sleeves are located in their respective positions.

19. The automated shift multi-speed transmission of claim 18 wherein an upshift from said first gear ratio to said second gear ratio results in said first sleeve being moved from its locked position to its released position, said fourth sleeve being moved from its released position toward its locked position for engaging said second friction clutch and synchronizing the speed of said output shaft to that of said second gearset, said second sleeve then being moved to its first locked position to positively couple said second gearset to said output shaft, and said fourth sleeve then being returned to its released position.

20. The automated shift multi-speed transmission of claim 19 wherein a downshift from said second gear ratio to said first gear ratio is established by moving said second sleeve from its first locked position to its released position, moving said first sleeve from its released position toward its locked position to engage said first friction clutch and synchronize the rotary speed of said first gearset to that of said output shaft, and then continuing movement of said first sleeve into its locked position for coupling said first gearset to said output shaft.

21. The automated shift multi-speed transmission of claim 19 where in an upshift from said second gear ratio to said third gear ratio results in said second sleeve being moved from its first locked position to its released position, said fourth sleeve being moved from its released position toward its locked position for engaging said second friction clutch and synchronizing the rotary speed of said output shaft to that of said third gearset, said second sleeve then being moved to its second locked position to positively couple said third gearset to said output shaft, and said fourth sleeve then being returned to its released position.

22. The automated shift multi-speed transmission of claim 21 wherein a downshift from said third gear ratio to said second gear ratio is established by moving said second sleeve from its second locked position to its released position, moving said first sleeve from its released position toward its locked position for engaging said first friction clutch and synchronizing the rotary speed of said second gearset to that of said output shaft, moving said second sleeve from its released position to its first locked position, and returning said first sleeve to its released position.

23. The automated shift multi-speed transmission of claim 21 wherein an upshift from said third gear ratio to said fourth gear ratio is established by moving said second sleeve from its second locked position to its released position, moving said fourth sleeve from its released position toward its locked position for engaging said second friction clutch and synchronizing the rotary speed of said fourth gearset to that of said output shaft, moving said third sleeve to its first locked position to couple said fourth gearset to said output shaft, and said fourth sleeve then being returned to its released position.

24. The automated shift multi-speed transmission of claim 23 wherein a downshift from said fourth gear ratio to said third gear ratio is established by moving said third sleeve from its first locked position to its released position, moving said first sleeve from its released position toward its locked position for engaging said first friction clutch and synchronizing the rotary speed of said third gearset to that of said output shaft, moving said second sleeve from its released position to its second locked position to directly couple said third gearset to said output shaft, and then returning said first sleeve to its released position.

25. An automated shift multi-speed transmission for transferring power from an engine to a driveline, comprising:

an input shaft;

an engine clutch operable to selectively establish a releaseable drive connection between the engine and said input shaft;

an output shaft adapted for connection to the driveline;

a synchromesh geartrain having a plurality of constant-mesh gearsets that can be selectively engaged to establish a plurality of forward and reverse speed ratio drive connections between said input shaft and said output shaft;

power-operated dog clutches for selectively engaging said constant-mesh gearsets; and a transmission controller for coordinating actuation of said engine clutch and said power-operated dog clutches;

wherein said power-operated dog clutch associated with said constant-mesh gearset provided to establish a lowest of said forward speed ratios is actuated during downshifts to controllably engage a first friction clutch for causing speed synchronization between said input shaft and said constant-mesh gearset associated with a desired forward speed ratio prior to actuation of its corresponding power-operated dog clutch for establishing said desired forward speed ratio drive connection, and wherein said power-operated dog clutch associated with said constant-mesh gearset provided to establish a highest of said forward speed ratios is actuated during upshifts to controllably engage a second friction clutch for causing speed synchronization between said input shaft and said constant-mesh gearset associated with a desired forward speed ratio prior to actuation of its corresponding power-operated dog clutch for establishing said desired forward speed ratio drive connection.

26. The automated shift multi-speed transmission of claim 25 wherein said first friction clutch is actuated to increase the rotary speed of said input shaft during a downshift, and wherein said second friction clutch is actuated to decrease the rotary speed of said input shaft during an upshift.

27. An automated shift multi-speed transmission for transferring power from an engine to a driveline, comprising:

an input shaft;

an engine clutch operable to selectively establish a releaseable drive connection between the engine and said input shaft;

an output shaft adapted for connection to the driveline;

a synchromesh geartrain having first, second and third constant-mesh gearsets that can be selectively engaged to establish first, second and third forward speed ratio drive connections between said input shaft and said output shaft;

first, second and third power-operated dog clutches for selectively engaging corresponding ones of said first, second and third constant-mesh gearsets; and a transmission controller for coordinating actuation of said engine clutch and said power-operated dog clutches;

wherein said first power-operated dog clutch associated with said first constant-mesh gearset provided to establish said first forward speed ratios is actuated during downshifts to controllably engage a first friction clutch for causing speed synchronization between said input shaft and said second constant-mesh gearset prior to actuation of said second power-operated dog clutch for establishing said second forward speed ratio drive connection, and wherein said third power-operated dog clutch associated with said third constant-mesh gearset provided to establish said third forward speed ratios is actuated during upshifts to controllably engage a second friction clutch for causing speed synchronization between said input shaft and said second constant-mesh gearset prior to actuation of said second power-operated dog clutch for establishing said desired forward speed ratio drive connection.

28. The automated shift multi-speed transmission of claim 27 wherein said first friction clutch is actuated to increase the rotary speed of said input shaft during a downshift while said second friction clutch is actuated to decrease the rotary speed of said input shaft during an upshift.

* * * * *